US011049525B2

United States Patent
Huber et al.

(10) Patent No.: US 11,049,525 B2
(45) Date of Patent: Jun. 29, 2021

(54) TRANSCRIPT-BASED INSERTION OF SECONDARY VIDEO CONTENT INTO PRIMARY VIDEO CONTENT

(71) Applicant: Adobe Inc., San Jose, CA (US)

(72) Inventors: Bernd Huber, Cambridge, MA (US); Bryan Russell, San Francisco, CA (US); Gautham Mysore, San Francisco, CA (US); Hijung Valentina Shin, Cambridge, MA (US); Oliver Wang, Seattle, WA (US)

(73) Assignee: ADOBE INC., San Jose, CA (US)

( * ) Notice: Subject to any disclaimer, the term of this patent is extended or adjusted under 35 U.S.C. 154(b) by 24 days.

(21) Appl. No.: 16/281,903

(22) Filed: Feb. 21, 2019

(65) Prior Publication Data
US 2020/0273493 A1    Aug. 27, 2020

(51) Int. Cl.
*G11B 27/11*    (2006.01)

(52) U.S. Cl.
CPC ..................... *G11B 27/11* (2013.01)

(58) Field of Classification Search
CPC .... G06F 40/289; G06F 3/0486; G06F 16/738; G06F 3/0482; G06F 16/732; G11B 27/11
USPC .................................. 386/382, 282
See application file for complete search history.

(56) References Cited

U.S. PATENT DOCUMENTS

| | | | | |
|---|---|---|---|---|
| 2012/0210221 A1* | 8/2012 | Khan | ................... | G11B 27/034 715/716 |
| 2013/0125000 A1* | 5/2013 | Fleischhauer | .... | H04N 21/47205 715/723 |
| 2014/0169767 A1* | 6/2014 | Goldberg | ............. | G11B 27/031 386/282 |
| 2017/0092332 A1* | 3/2017 | Bostick | ................ | G11B 27/002 |
| 2018/0204597 A1* | 7/2018 | Rav-Acha | ............ | G11B 27/031 |

OTHER PUBLICATIONS

Adobe, "Adobe Stock", https://stock.adobe.com/, Accessed Nov. 9, 2018, 5 pages.
Giphy, "Search All the GIFS & Make your Own Animated GIF", https://www.giphy.com, Accessed Nov. 9, 2018. 7 pages.

(Continued)

*Primary Examiner* — Helen Shibru
(74) *Attorney, Agent, or Firm* — Kilpatrick Townsend & Stockton LLP

(57) ABSTRACT

Certain embodiments involve transcript-based techniques for facilitating insertion of secondary video content into primary video content. For instance, a video editor presents a video editing interface having a primary video section displaying a primary video, a text-based navigation section having navigable portions of a primary video transcript, and a secondary video menu section displaying candidate secondary videos. In some embodiments, candidate secondary videos are obtained by using target terms detected in the transcript to query a remote data source for the candidate secondary videos. In embodiments involving video insertion, the video editor identifies a portion of the primary video corresponding to a portion of the transcript selected within the text-based navigation section. The video editor inserts a secondary video, which is selected from the candidate secondary videos based on an input received at the secondary video menu section, at the identified portion of the primary video.

20 Claims, 10 Drawing Sheets

(56) References Cited

OTHER PUBLICATIONS

Young, Katie, "Over 4 in 10 Watch vlogs", Vlogs Statistics, https://blog.globalwebindex.com/chart-of-the-day/over-4-in-10-watch-vlogs/, Accessed: Nov. 9, 2018, 3 pages.
Wibbitz, "Make Video Production Quick and Easy for Anyone on Your Team", https://www.wibbitz.com, Accessed: Nov. 9, 2018, 6 pages.
Wochit, "Make Videos Worth Sharing", https://www.wochit.com, Accessed: Nov. 9, 2018, 7 pages.
Arev, Ido, et al., "Automatic Editing of Footage From Multiple Social Cameras", ACM Transactions on Graphics (TOG) vol. 33, Issue 4, Jul. 2014 11 pages.
Berthouzoz, Floraine, et al., "Tools for Placing Cuts and Transitions in Interview Video", ACM Transactions Graphics (TOG), vol. 31, Issue 4, Jul. 2012, 8 pages.
Biel, Joan-Isaac et al., "VlogSense: Conversational Behavior and Social Attention in Youtube", ACM Transactions on Multimedia Computing, Communications, and Applications (TOMM) vol. 7S, Issue 1, Article 33, Oct. 2011, 20 pages.
Casares, Juan, et al., "Simplifying Video Editing Using Metadata", In Proceedings of the 4th conference on Designing interactive systems: processes, practices, methods, and techniques, ACM, Jun. 2002, 10 pages.
Davis, Marc, Editing Out Video Editing, IEEE multimedia, vol. 10, Issue 2, Apr.-Jun. 2003, 1 page.
Girgensohn, Andreas, et al, "A Semi-Automatic Approach to Home Video Editing", In Proceedings of the 13th annual ACM Symposium on User Interface Software and Technology, ACM, Nov. 2000, 9 pages.
Grabler, Floraine, et al., "Generating Photo Manipulation Tutorials by Demonstration", In ACM Transactions on Graphics (TOG), vol. 28. ACM, Article 66, Aug. 2009, 9 pages.
Hart, Sandra G., et al., "Development of NASATLX (Task Load Index): Results of Empirical and Theoretical Research", In Advances in Psychology, vol. 52. Elsevier, 1988, 2 pages.
Hutto, Clayton J., et al., "Vader: A Parsimonious Rule-Based Model for Sentiment Analysis of Social Media Text", In Eighth international AAAI conference on weblogs and social media, 2014, 10 pages.
Iarussi, Emmanuel, et al., "The Drawing Assistant: Automated Drawing Guidance and Feedback From Photographs", In ACM Symposium on User Interface Software and Technology (UIST), ACM, Jul. 2013, 10 pages.
Jain, Eakta, et al., "Gaze-Driven Video Re-Editing", ACM Transactions on Graphics (TOG) vol. 34, Issue 2, Article 21, Feb. 2015, 12 pages.
Kiperwasser, Eliyahu, et al., "Simple and Accurate Dependency Parsing Using Bidirectional LSTM Feature Representations", arXiv preprint arXiv:1603.04351 2016, 15 pages.
Lee, Jihyeon Janel, et al., "Automatically Visualizing Audio Travel Podcasts", In Adjunct Publication of the 30th Annual ACM Symposium on User Interface Software and Technology, ACM, Oct. 2017, 2 pages.
Lu, Zheng, et al., "Story-Driven Summarization for Egocentric Video", In Proceedings of the IEEE Conference on Computer Vision and Pattern Recognition, Jun. 2013, 8 pages.
Murch, Walter, "In the Blink of an Eye: A Perspective on Film Editing", Silman-James Press, 2001, 20 pages.
O'Steen, Bobbie, "The Invisible Cut", Michael Wiese Productions, 2009, 9 pages.
Pavel, Amy, et al., "Sceneskim: Searching and Browsing Movies Using Synchronized Captions, Scripts and Plot Summaries", In Proceedings of the 28th Annual ACM Symposium on User Interface Software & Technology, ACM, Nov. 2015, 10 pages.
Pavel, Amy, et al., "Vidcrit: Video-Based Asynchronous Video Review", In Proceedings of the 29th Annual Symposium on User Interface Software and Technology, ACM, Oct. 2016, 12 pages.
Rubin, Steve, et al., "Content-Based Tools for Editing Audio Stories", In Proceedings of the 26th annual ACM Symposium on User Interface Software and Technology, ACM, Oct. 2013, 10 pages.
Schmittauer, Amy, "Vlog Like a Boss: How to Kill it Online with Video Blogging", Author Academy Elite, 2017, 1 page.
Shin, Hijung Valentina, et al., "Visual Transcripts: Lecture Notes From Blackboard-Style Lecture Videos", ACM Transactions on Graphics (TOG) vol. 34, Issue 6, Article 240, Nov. 2015, 10 pages.
Shin, Hijung Valentina, et al., "Dynamic Authoring of Audio With Linked Scripts", In Proceedings of the 29th Annual Symposium on User Interface Software and Technology. ACM, Oct. 2016, 8 pages.
Suykens, Johan AK, et al., "Least Squares Support Vector Machine Classifiers", Neural Processing Letters, vol. 9, Issue 3, Jun. 1999, 10 pages.
Truong, Anh, et al., "Quickcut: An Interactive Tool for Editing Narrated Video", In Proceedings of the 29th Annual Symposium on User Interface Software and Technology. ACM, Oct. 2016, 2 pages.
Wang, Cheng-Yao, et al., EverTutor: Automatically Creating Interactive Guided Tutorials on Smartphones by User Demonstration, In Proceedings of the SIGCHI Conference on Human Factors in Computing Systems, ACM, Apr.-May 2014, 2 pages.
Zsombori, Vilmos, et al., "Automatic Generation of Video Narratives From Shared UGC", In Proceedings of the 22nd ACM conference on Hypertext and Hypermedia. ACM, Jun. 2011, 10 pages.
Biel, Joan-Isaac, et al., You Are Known by How You Vlog: Personality Impressions and Nonverbal Behavior in YouTube, In ICWSM, Proceedings of the Fifth International AAAI Conference on Weblogs and Social Media, 2011 4 pages.
Clark, Herbert, et al., "Grounding in Communication", Perspectives on Socially Cognition 13, 1991, 12 pages.
Heck, Rachel, et al., "Virtual Videography", ACM Transactions on Multimedia Computing, Communications and Applications (TOMM) vol. 3, No. 1, Article 4, Feb. 2007, 28 pages.
Jin, Zeyu, et al., "VoCo: Text-Based Insertion and Replacement in Audio Narration", ACM Transactions on Graphics (TOG) vol. 36, No. 4, Articles 96, Jul. 2017, 13 pages.
Li, Francis C., et al., "Browsing Digital Video", In Proceedings of the SIGCHI Conference on Human Factors in Computing Systems, ACM, Apr. 2000, 8 pages.
Ranjan, Abhishek, et al., "Improving Meeting Capture by Applying Television Production Principles with Audio and Motion Detection", In Proceedings of the SIGCHI Conference on Human Factors in Computing Systems, ACM, Apr. 2008, 10 pages.
Whittaker, Steve, et al., "Semantic Speech Editing", In Proceedings of the SIGCHI Conference on Human Factors in Computing Systems, ACM, 2004, 8 pages.

* cited by examiner

TRANSCRIPT-BASED INSERTION OF SECONDARY VIDEO CONTENT INTO PRIMARY VIDEO CONTENT

TECHNICAL FIELD

This disclosure relates generally to computer-implemented methods and systems for digital video processing. Specifically, the present disclosure involves transcript-based techniques for performing or otherwise facilitating insertion of secondary video content into primary video content.

BACKGROUND

Video editing applications are used to generate visually engaging video content for both personal and professional communication. To increase a potential viewer's engagement with a video, video editing applications are often used to edit a primary video (e.g., an "A-Roll" video) by briefly cutting away to secondary video content (e.g., a "B-Roll" video). For instance, a user may edit an online tutorial in which a speaker describes how to change a tire (i.e., the primary video) to insert a brief video clip that depicts a particular step of the tire-changing process (i.e., the secondary video) retrieved from a public video source, with the main audio track of the speaker's vocal instructions remaining unchanged in the edited video content.

Existing video-editing techniques present challenges to end users. As one example, a novice user may be unable to efficiently select a suitable start point in the primary video for inserting the secondary video. For instance, a secondary video could depict removing a flat tire and the end user may wish to insert the secondary video at a point where a speaker gives the instruction "Now, remove the tire." To do so, the end user must manually watch the primary video to locate a relevant portion of the primary video, note the located portion, and manually specify the insertion point for the relevant secondary video. As another example, a novice user may be unable to efficiently identify potential secondary videos that would visually enhance the primary video. For instance, an end user may need to review the primary video multiple times and experiment with alternative choices of secondary videos, which can be time consuming.

Therefore, existing solutions may involve disadvantages for reasons such as (but not limited to) those described above.

SUMMARY

Certain embodiments involve transcript-based techniques for performing or otherwise facilitating insertion of secondary video content into primary video content. In one example, a video editor presents a video editing interface having a primary video section displaying a primary video, a text-based navigation section having selectable portions of a transcript of the primary video that trigger navigation to respective portions of the primary video, and a secondary video menu section displaying candidate secondary videos. The video editor selects a portion of the transcript corresponding to a text-selection input received at the text-based navigation section. The video editor also identifies a portion of the primary video corresponding to the selected portion of the transcript. The video editor also selects, from the candidate secondary videos, a secondary video corresponding to a video-selection input received at the secondary video menu section. The video editor inserts the selected secondary video into the primary video at the identified portion of the primary video.

In additional or alternative embodiments, the video editing interface is used to find suitable candidate secondary videos for insertion. For example, the video editor detects target terms in the transcript and applies, in the text-based navigation section, selectable recommendation indicators to the detected target terms. The video editor responds to a selection of a recommendation indicator by generating a candidate video query having a query parameter that includes or is derived from a detected target term corresponding to the recommendation indicator. The video editor submits the candidate video query and thereby retrieves candidate secondary videos. The video editor displays, in the secondary video menu section, selectable visual representations of the retrieved candidate secondary videos.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
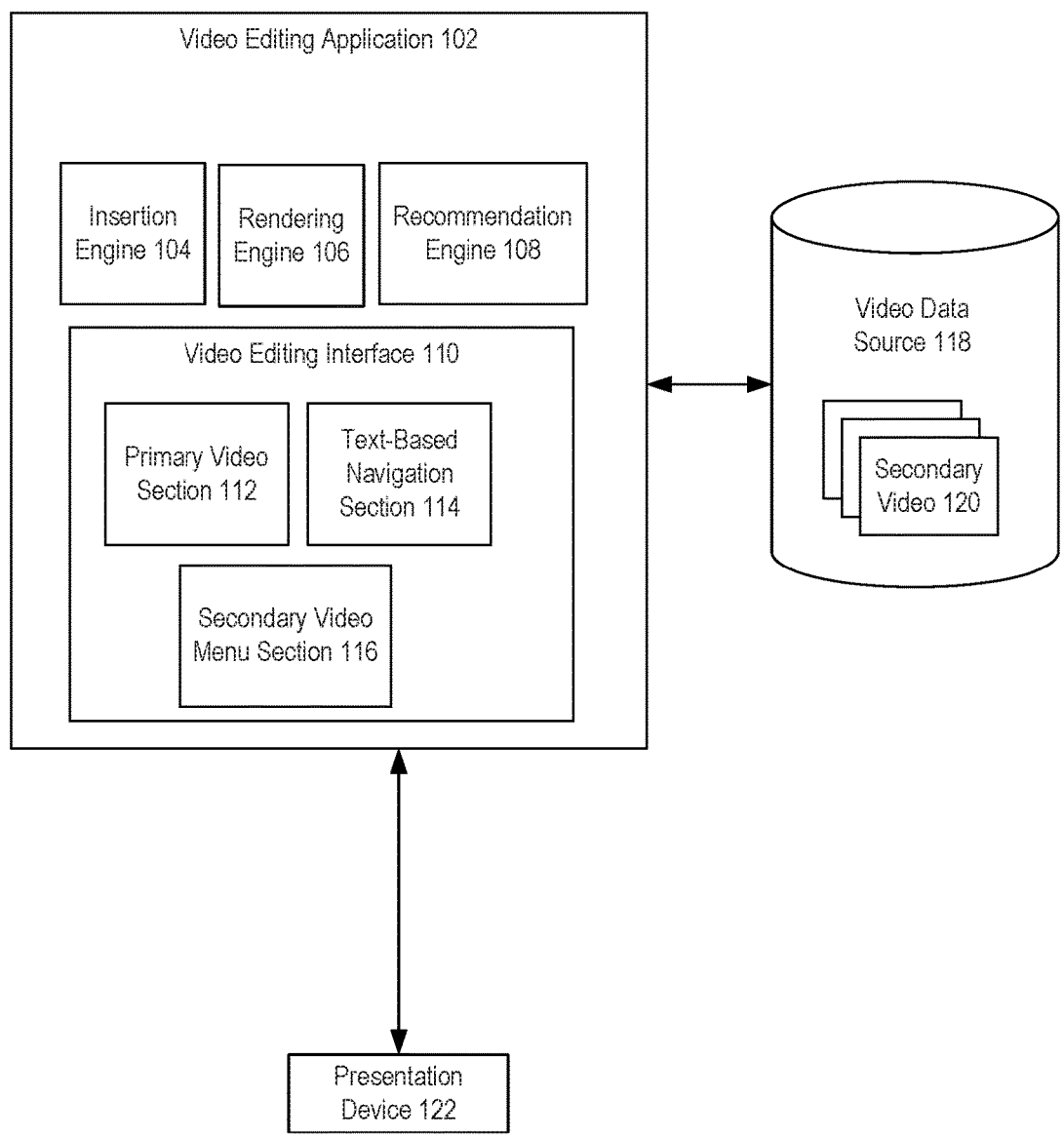
FIG. 1 depicts an example of a computing environment for using a video editing application to perform transcript-based insertion of secondary video content into primary video content, according to certain embodiments of the present disclosure.

The present disclosure includes systems and methods performing or otherwise facilitating insertion of secondary video content into primary video content. As discussed above, existing video techniques often entail cumbersome or time-consuming processes for inserting relevant secondary video content into a primary video, identifying relevant secondary videos to be inserted, or both. Certain embodiments described herein can address these limitations by using transcript-based techniques that allow for intuitive retrieval of secondary video content into primary video content, insertion of secondary video content into primary video content, or some combination thereof. For instance, a video editing application can provide a video editing interface that displays both a primary video and a transcript of the primary video. The video editing application can identify a portion of the primary video using a selection, via the video editing interface, of a transcript portion. The video editing application could include functionality in which, for example, dragging and dropping an icon representing a secondary video onto the selected transcript portion causes the video editing application to insert the secondary video at the primary video portion identified via the selection of the transcript. Thus, in this example, the video editing interface allows a visual representation of an audio track (i.e., a displayed transcript) to guide the placement of secondary video content within a primary video, which can provide an intuitive video editing process to a novice end user.

The following non-limiting example is provided to introduce certain embodiments. In this example, a video editing application presents a video editing interface at a user device. The video editing interface includes a primary video section, a text-based navigation section, and a secondary video menu section. For instance, the primary video section could display a primary video being edited by a user, such as a self-help video presentation, and the text-based navigation section could display a transcript of the self-help video. The text-based navigation section could include selectable portions of the transcript of the primary video, where selecting a certain transcript portions causes the video editing application to navigate, within the video editing interface, to a corresponding section of the primary video. For instance, if the transcript includes the phrase "help others," a selection of that phrase can cause the video editing application to identify a section of the primary video in which that phrase is spoken on an accompanying audio track. The selection of that phrase can also cause the video editing application to display one or more frames of that section in the primary video section.

Continuing with this example, the video editing application also uses selections of the transcript to insert secondary video content into the primary video being edited. For instance, the video editing application receives, at the text-based navigation section, a text-selection input indicating a portion of the transcript, such as the "help others" phrase discussed above. The video application selects the portion of the transcript and identifies a corresponding portion of the primary video, such as a start frame for a primary video portion in which the "help others" audio is played. The video editing application also receives, at the secondary video menu section, a video-selection input that indicates one or more of the candidate secondary videos. For instance, the video-selection input could be a selection of a particular candidate video along with a click of an interface element for inserting the video, a dragging input that moves a visual representation of a particular candidate video over a selected portion of the transcript, etc. The video editing application inserts the selected secondary video into the primary video at the identified portion of the primary video. For instance, the video application performs a playback operation in which frames of the primary video at which the "help others" audio is played are replaced with frames of a selected secondary video, such as a short video clip of a rescue worker assisting an accident victim. In this manner, the transcript of a primary video can be used as a guide for inserting secondary video content into a primary video being edited.

In additional or alternative embodiments, the video editing application uses the transcript to generate recommendations for candidate videos. For instance, the video editing application could detect target terms in the transcript. A target term can be a word or phrase that corresponds to a portion of the primary video at which the insertion of a secondary video could aesthetically enhance the primary video. For instance, the video editing application could apply a classifier to the phrase "help others," and the classifier could output a value indicating that inserting a secondary video to illustrate the concept of helping other would enhance the presentation of the primary video. The video editing application applies, in the text-based navigation section, selectable recommendation indicators to the detected target terms.

For instance, the video editing application could update the text-based navigation section by highlighting the text "help others" and positioning a recommendation indicator, such as a query-generation button, near the highlighted text. If the video editing application receives a selection of a recommendation indicator, the video editing application generates a candidate video query having a query parameter that includes or is derived from a detected target term corresponding to the recommendation indicator. In this example, the video editing application could generate a query for secondary videos tagged with "help" or "help others." The video editing application retrieves candidate secondary videos by submitting the candidate video query to one or more data sources, such as online repositories of short video clips or other multimedia content. The video editing application displays, in the secondary video menu section, selectable visual representations (e.g., thumbnails) of the retrieved candidate secondary videos. One or more of the retrieved candidate secondary videos can then be inserted into a primary video using the process described above.

Certain embodiments provide improvements to computing systems used for editing video content. For instance, as noted above, existing video techniques often entail cumbersome or time-consuming processes for inserting relevant secondary video content into a primary video, identifying relevant secondary videos to be inserted, or both. These problems can be addressed by various video interface features described herein. For instance, a video interface can have a structure including a text-based navigation section, a secondary video menu section, and a primary video section. The functionality paired with this structure, such as using the text-based navigation section to generate queries for secondary videos and/or moving visual indicators of candidate secondary videos to portions of a transcript in the text-based navigation section, allows for editing primary video content more intuitively than existing solutions. Thus, the structure and associated functionality of the interface features described herein can provide improvements in the field of video editing.

Operating Environment Example for Transcript-Based Insertion of Secondary Video Content into Primary Video Content Referring now to the drawings, FIG. 1 depicts an example of a computing environment 100 for using a video editing application 102 to perform transcript-based insertion of secondary video content into primary video content. The computing environment 100 includes one or more processing devices that execute a video editing application 102, one or more video data sources 118 that store one or more secondary videos 120, and a presentation device 122 that is controlled based on the video editing application 102. In this example, the video editing application 102 includes an insertion engine 104, a recommendation engine 108, and a rendering engine 106. The video editing application 102 also generates a video editing interface 110. The video editing application 102 used commands and other inputs received via the video editing interface 110 to control one or more operations of the insertion engine 104, the recommendation engine 108, and the rendering engine 106.

The video editing application 102 provides the video editing interface 110 for display at a presentation device 122, which can be a local presentation device or a computing device that is remotely accessible over a data network. In this example, the video editing interface 110 includes a primary video section 112, a text-based navigation section 114, and a secondary video menu section 116. The primary video section 112 displays primary video content. The primary video content can include a primary video prior to an insertion of secondary video content, a primary video with secondary video content inserted between certain frames of the primary video, or both. The text-based navigation section 114 displays a transcript associated with the primary video. The video editing application 102 can receive user inputs to the text-based navigation section 114, such as a click on a word of the displayed transcript, and update the primary video section 112 to display a portion of the primary video in which the word occurs. The secondary video menu section 116 displays visual representations, such as thumbnails or title graphics, of secondary videos 120. The video editing application 102 can receive user inputs to the secondary video menu section 116, such as a click on a visual representation of a particular secondary video 120, and perform an insertion operation based on a selection of the particular secondary video 120.

For instance, the insertion engine 104 includes one or more software modules that edit, create, or otherwise provide access to video content in which content one or more secondary videos 120 have been inserted into primary video content. As described in more detail with respect to FIGS. 2-4, the insertion engine 104 can identify a target portion of the primary video based on user inputs to the text-based navigation section 114. The insertion engine 104 can also replace the target portion with a secondary video 120 that is selected via inputs to the secondary video menu section 116.

In some embodiments, the insertion engine 104 creates a playlist or other media orchestration file that identifies sequences of primary video frames and secondary video frames to be displayed on a presentation device 122 in a playback operation. In a simplified example, a primary video, such as a video blog titled "Developing Patentable Inventions," could include a sequence of frames A, B, C, and D. A secondary video, such as a viral video depicting a light bulb appearing over a person's head, could include frames E and F. The insertion engine 104 could create, based on one or more inputs received via the video editing interface 110, a media orchestration file specifying that secondary video content from frames E to F should replace primary video content from frames B to C. The combined primary and secondary video resulting from this replacement operation would include a sequence of frames A, E, F, and D. In additional or alternative embodiments, the insertion engine 104 can export a video file having the combination of primary and secondary video by editing a primary video file to replace certain primary video content (e.g., primary video content from frames B to C) with selected secondary video content (e.g., secondary video content from frames E to F), creating a new video file having the combination of primary and secondary video without changing either source video, or both.

The rendering engine 106 includes one or more software modules that render content for display in a video editing interface 110. This content can include primary video content having inserted secondary video content. In some embodiments, the rendering engine 106 retrieves video content from both a primary video file and a secondary video file. The rendering engine 106 can render a combination of primary and secondary video in real time, without requiring edits to the primary video file. For instance, the rendering engine 106 can render a sequence of retrieved frames in accordance with a playlist or other media orchestration file generated by the insertion engine 104. Examples of this real-time rendering of combined video content are described herein with respect to FIGS. 5 and 6.

The recommendation engine 108 includes one or more software modules that obtain secondary video content by generating, submitting, or otherwise using queries to one or more video data sources 118. For instance, the recommendation engine 108 can analyze a transcript of a primary video and identify, based on the analysis, one or more search terms. The recommendation engine 108 can output the suggested search terms via the video editing interface 110 by, for example, applying selectable visual indicators to portions of a transcript displayed in the text-based navigation section 114. If the video editing application 102 receives a selection of one of these indicators, the video editing application 102 can generate a query that includes a corresponding search term that is identified from the transcript analysis. The video editing application 102 can submit the query to one or more video data sources 118. The video editing application 102 can update the secondary video menu section 116 to display visual representations of secondary videos that match the submitted query. Examples of this query generation and submission process are described herein with respect to FIGS. 7-9.

One or more of the insertion engine 102, the rendering engine 106, and the recommendation engine 106 includes one or more sets of program code that can control the operation of a display device (e.g., by rendering one or more interfaces on the display device). Examples of this program code include program code for rendering content for display, program code for creating one or more instances of event listeners or other suitable objects for receiving input from input devices (e.g., a mouse, a touchscreen, etc.), program code for modifying the appearance of interface elements based on input received from input devices (e.g., moving a cursor, changing the colors of certain pixels displayed on the screen, etc.). The video editing interface 110 includes sections (e.g., the primary video section 112, the text-based navigation section 114, the secondary menu video section 116) with one or more interactive interface elements (e.g., buttons, text fields, selectable text, elements that can be dragged, playback controls, etc.) and one or more instances of event listeners or other programming objects for receiving input with respect to these interface elements. One or more of the insertion engine 102, the rendering engine 106, and the recommendation engine 106 also includes one or more sets of program code that can generate modify video content, audio content, or control data for audio or video content. For instance, one or more of these engine can include program code for modifying a playlist or other control data that controls the sequence in which different video content portions, different audio content portions, or both are played back.

Figure 2:
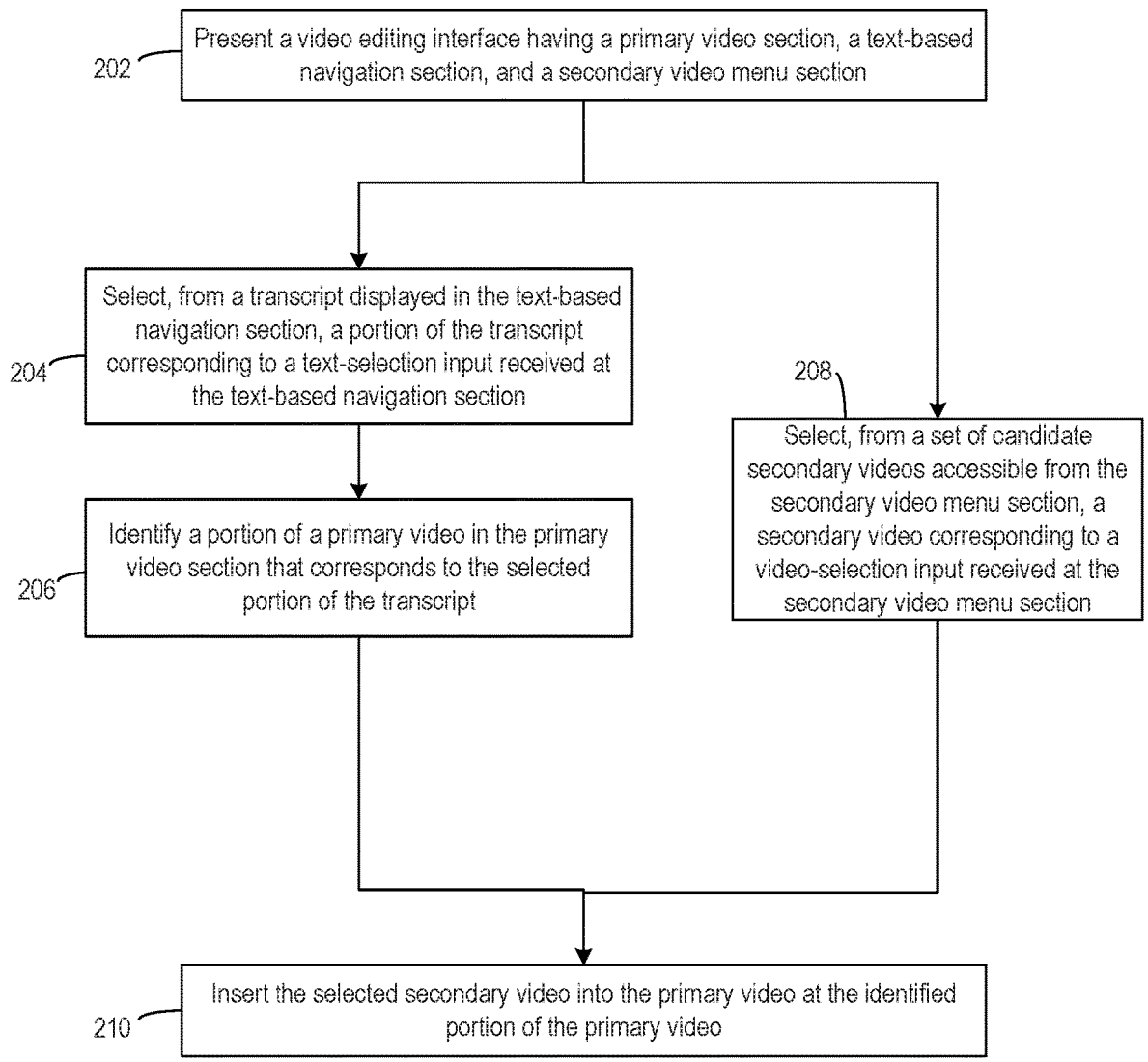
FIG. 2 depicts an example of a process for transcript-based insertion of secondary video content into primary video content using the video editing application of FIG. 1, according to certain embodiments of the present disclosure.

Examples of Computer-Implemented Operations for Transcript-Based Video-Insertion or Location FIG. 2 depicts an example of a process 200 for transcript-based insertion of secondary video content into primary video content. Operations depicted in FIG. 2 can be used to implement a step for inserting secondary video content into primary video content based on selections via a navigable transcript of the primary video content. One or more computing devices (e.g., the computing environment 100) implement operations depicted in FIG. 2 by executing suitable program code (e.g., the video editing application 102). For illustrative purposes, the process 200 is described with reference to certain examples depicted in the figures. Other implementations, however, are possible.

At block 202, the process 200 involves presenting a video editing interface having a primary video section, a text-based navigation section, and a secondary video menu section. One or more computing devices can execute program code of the video editing application 102 to implement block 202. For instance, the video editing application 102 can use the rendering engine 106 to render the video editing interface 110 for display on a presentation device 122. The video editing application 102 can output the video editing interface 110 via any suitable process. In some embodiments, which could involve a cloud-based execution or other remote execution of the video editing application 102, the video editing application 102 configures a computing device to communicate commands and data via a data network that cause a remotely located presentation device 122 to present the video editing interface 110. In additional or alternative embodiments, which could involve a locally executed video editing application 102, the video editing application 102 configures one or more processing devices to communicate commands and data via a bus or other local communication interface to a presentation device 122 to present the video editing interface 110.

Figure 3:
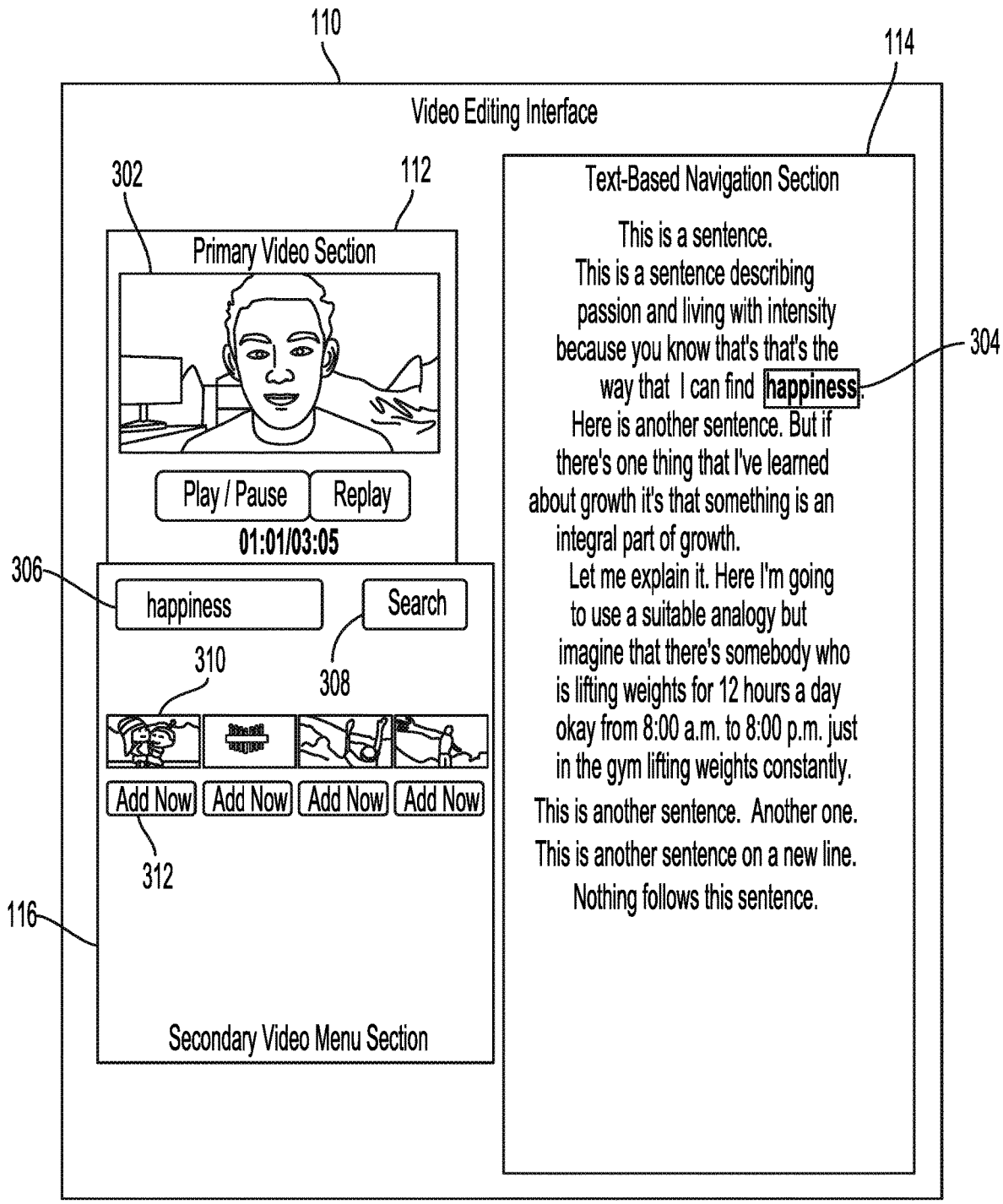
FIG. 3 depicts an example of a video editing interface from FIG. 1 that is used for transcript-based insertion of secondary video content into primary video content, according to certain embodiments of the present disclosure.

FIG. 3 depicts an example of a video editing interface 110 for transcript-based insertion of secondary video content into primary video content. The primary video section 112 displays a primary video 302. In this example, the primary video section 112 includes playback control commands (e.g., play, pause, replay, etc.) and a timer indicating a progress of the primary video (e.g., that a currently displayed frame occurs at time 1:01 out of a total duration of 3:05 for the primary video 302).

The text-based navigation section 114 depicts a transcript 303 of audio content associated with the primary video 302 (e.g., an audio track included with the primary video content). The transcript 303 that can be used to navigate to different portions of the primary video 302. For instance, the transcript 303 could include selectable portions that, if selected by a user input, trigger navigation to respective sections of the primary video 302. In the example depicted in FIG. 3, an input 304 that selects a particular word in the transcript 303 can cause a video frame associated with audio of that word to be displayed in the primary video section 112. The input 304 can be provided by any suitable user input (e.g., a mouse click, a tap on a touchscreen, a dragging input that selects part of the relevant word or phrase, etc.). Thus, the video editing application 102 can navigate to a first portion of the primary video 302 (e.g., the frame at time 10:13) if a first word or phrase is selected (e.g., the transcription of the audio content at time 10:13) and can navigate to a second portion of the primary video 302 (e.g., the frame at time 11:38) if a second word or phrase is selected (e.g., the transcription of the audio content at time 11:38).

The secondary video menu section 116 displays one or more visual representations of candidate secondary videos 310. In this example, the secondary video menu section 116 includes thumbnails of the candidate secondary videos 310. But other visual representations may be used. In some embodiments, certain user inputs (e.g., hovering over a candidate video) can cause a preview of particular candidate secondary videos to be presented, such as by commencing playback of the candidate secondary video at the location of the corresponding thumbnail, playing the candidate secondary video in a pop-up window, etc. In some embodiments, the secondary video menu section 116 includes one or more controls for selecting a candidate secondary video for insertion into a primary video. For instance, in FIG. 3, the secondary video menu section 116 displays buttons 312 labeled "Add Now" under the candidate secondary videos 310. Clicking a button 312 can insert a selected secondary video into the primary video 302 for display via the primary video section 112. Examples of this insertion are described herein with respect to block 210 of FIG. 2.

The candidate secondary videos can be obtained in any suitable manner. In some embodiments, the video editing application 102 receives, via the video editing interface 110, one or more target terms via a search field 306 of the secondary video menu section 116. The video editing application 102 also receives, via the video editing interface 110, a command to submit a query using the received target terms. For instance, in FIG. 3, clicking the button 308 labeled "search" causes a search query with the term "learn" to be submitted. The video editing application 102 generates a candidate video query having a query parameter that includes or is derived from the received target term. The video editing application 102 retrieves the candidate secondary videos by submitting the candidate video query to one or more data sources having the candidate secondary videos. The video editing application 102 displays, in the secondary video menu section 116, selectable visual representations of the retrieved candidate secondary videos.

The example of a video editing interface 110 depicted in FIG. 3 is provided for illustrative purposes. Other examples of a video editing interface 110 could include a different layout of the various sections, a selective display or hiding of various sections, additional or different playback commands, etc.

Returning to FIG. 2, at block 204, the process 200 involves selecting, from a transcript displayed in the text-based navigation section, a portion of the transcript corresponding to a text-selection input received at the text-based navigation section. One or more computing devices can execute program code of the video editing application 102 to implement block 204.

Figure 4:
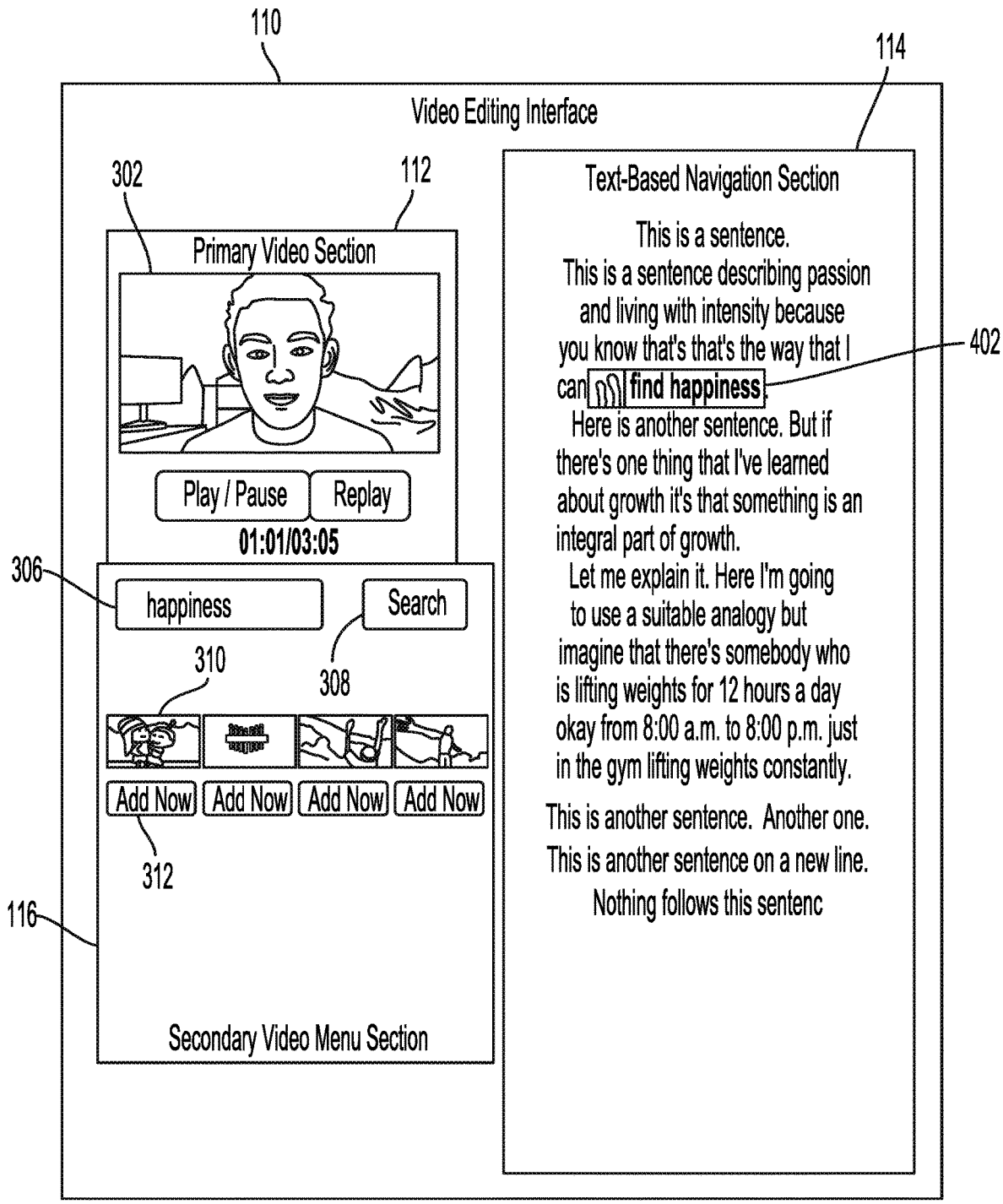
FIG. 4 depicts an example of the video editing interface from FIG. 3 in which a text-based navigation section has received an input selecting a transcript portion, according to certain embodiments of the present disclosure.

For instance, the video editing interface 110 detects user inputs via one or more event listeners of the text-based navigation section 114. For instance, the event listener could detect a combination of events, such as a mouse click and a mouse drag, that are located or otherwise directed to the text-based navigation section 114. The video editing interface 110 causes the video editing application 102 to identify one or more words or phrases of the transcript to be selected. For instance, FIG. 4 depicts an example of the video editing interface 110 in which a text-based navigation section 114 has received an input selecting a transcript portion 402. In this example, the selection input has highlighted a phrase within the transcript.

At block 206, the process 200 involves identifying a portion of a primary video in the primary video section that corresponds to the selected portion of the transcript. One or more computing devices can execute program code of the video editing application 102 to implement block 206. For instance, the video editing application 102 can access mapping data that identifies a mapping between particular words of the transcript and particular portions of a primary video. A mapping could indicate, for example, that a word or phrase "find happiness" occurs at time stamp 1:01. If the video editing application 102 receives a selection of "find happiness" in a transcript 304, the video editing application 102 refers to the mapping data to identify a corresponding time stamp. The video editing application 102 updates the primary video section 112 to display one or more frames of the primary video that occur at or near the identified time stamp.

The mapping data can be obtained in any suitable manner. For instance, a suitable module could generate a transcript by applying a transcription process to an audio track associated with the primary video and thereby transcribe the audio content from the audio track. The transcription process can create time stamps that are associated with words or phrases in the resulting transcript. The module can identify, by referencing metadata from the primary video file that synchronizes the audio track with video frames of the primary video content, which frames correspond to a time stamp for a given word or phrase. The module can thereby generate a mapping between one or more frames to be displayed at a given time stamp and a corresponding word or phrase that is transcribed from the audio that is played at the same time stamp. In some embodiments, the video editing application 102 requests the mapping data from a third-party service, such as automatic transcription services. In additional or alternative embodiments, the video editing application 102 includes one or more modules for generating the mapping data.

The process 200 also involves identifying secondary video content to be inserted into primary video content. At block 208, the process 200 involves selecting, from a set of candidate secondary videos accessible from the secondary video menu section, a secondary video corresponding to a video-selection input received at the secondary video menu section. One or more computing devices can execute program code of the video editing application 102 to implement block 208.

For instance, the video editing interface 110 detects user inputs via one or more event listeners of the secondary video menu section 116. For instance, the event listener could detect one or more input events that are located or otherwise directed to a visual representation of a candidate secondary video within the secondary video menu section 116. Examples of these input events include one or more mouse clicks selecting a visual representation (e.g., a thumbnail) a particular one of the candidate secondary videos 310, a dragging input that drags a visual representation of the selected secondary video over the selected portion of the transcript in the text-based navigation section, etc. The video editing interface 110 causes the video editing application 102 to identify, as a selected secondary video, the secondary video content corresponding to the visual representation to which the input event was directed.

Various combinations of identifying the primary video portion to be replaced and selecting the secondary video can occur. In one example, the video editing application 102 can receive an input 304 that selects a transcript portion (and thereby identifies a corresponding primary video portion) prior to receiving an input that selects a secondary video. In another example, the video editing application can receive an input 304 that selects a transcript portion (and thereby identifies a corresponding primary video portion) after receiving an input that selects a secondary video. In another example, the video editing application can receive an initial input 304 that selects a transcript portion, then receive an input that selects a secondary video, and then receive another input to the text-based navigation section 114 that selects a different transcript portion and thereby identifies a different corresponding primary video portion.

At block 210, the process 200 involves inserting the selected secondary video into the primary video at the identified portion of the primary video. One or more computing devices can execute program code of the video editing application 102 to implement block 210. Inserting the selected secondary video into the primary video can include one or more operations that cause frames of the primary video to be displayed in a sequence within the video editing interface 110 and for one or more frames of the secondary video to be included in the same sequence within the video editing interface 110. In some embodiments, the video editing application 102 inserts the selected secondary video into the primary video without editing a file that includes the primary video. In additional or alternative embodiments, the video editing application 102 inserts the selected secondary video into the primary video by editing a file that includes the primary video to include the primary video. In additional or alternative embodiments, the video editing application 102 inserts the selected secondary video into the primary video by creating a new file that includes the primary video and the secondary video.

For instance, the rendering engine 106 identifies various time stamps that are associated with playback of the primary video, wherein the second time stamp corresponds to the identified portion of the primary video. The rendering engine 106 performs a playback operation in the video editing interface 110 using the time stamps. The playback operation involves rendering one or more first frames from the primary video for display between a first time stamp of the primary video and a second time stamp of the primary video. The playback operation also involves determining that the selected secondary video has been selected for insertion into the primary video. The playback operation also involves rendering frames retrieved from the secondary video for display. In one example, the rendering engine 106 renders the secondary video starting at the second time stamp and continuing for a duration between the second time stamp and a third time stamp of the primary video. In some embodiments, the video editing application 102 plays the audio of the primary video concurrently with displaying the secondary video frames. The playback operation also involves rendering one or more second frames from the primary video for display. The second frame can be played back starting from the third time stamp of the primary video.

In some embodiments, inserting the selected secondary video into the primary video at the identified portion of the primary video involves the rendering engine 106 performing one or more playback operations in real time. The real-time playback operation can include retrieving and rendering frames from a primary video file and a secondary video file for display in the video editing interface 110.

Figure 5:
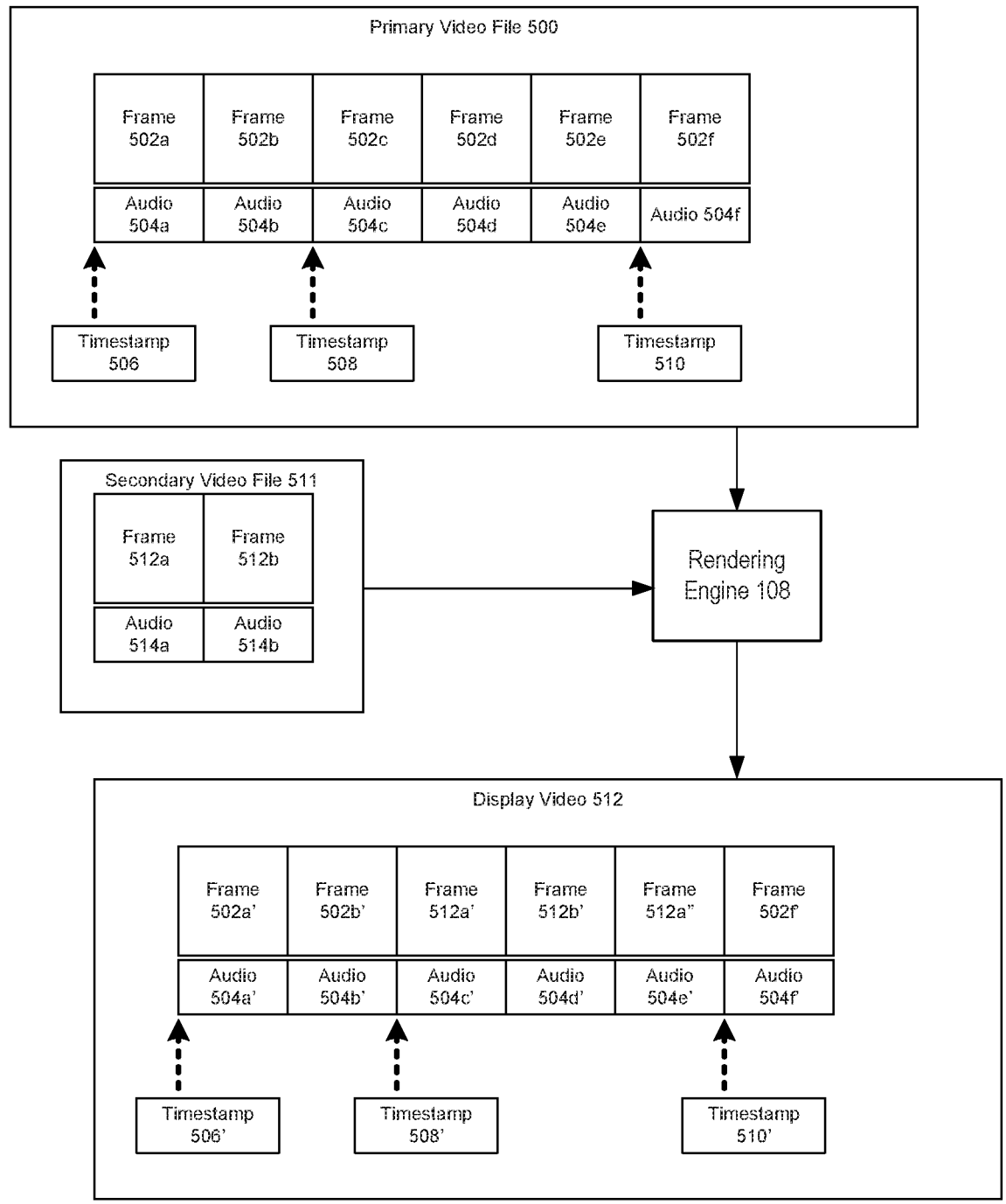
FIG. 5 depicts an example of a rendering engine used by the video application of FIG. 1 inserting secondary video content frames between sets of primary content frames, according to certain embodiments of the present disclosure.

This real-time playback operation can occur without having to edit the primary video file. For instance, FIG. 5 depicts an example of a rendering engine 106 inserting secondary video content frames between sets of primary content frames. In the example depicted in FIG. 5, the rendering engine 106 can access, in the playback operation, a primary video file 500 that includes frames 502a-f of the primary video. In this example, the primary video file 500 lacks any content from the selected secondary video. The primary video file 500 also includes audio portions 504a-f that correspond to different portions of the primary video. For illustrative purposes, FIG. 5 depicts a simplified example in which a given one of the frames 502a-f corresponds to a given one of the audio portions 504a-f. The primary video file 500 also includes timestamps that correspond to the video portions of the primary video, the audio portions associated with the primary video, or both. For instance, FIG. 5 depicts a timestamp 506 corresponding to a frame 502a and an audio portion 504a, a timestamp 508 corresponding to a frame 502c and an audio portion 504c, and a timestamp 510 corresponding to a frame 502f and an audio portion 504f.

In the playback operation, the rendering engine 106 retrieves frames from the primary video file 500 and a secondary video file 511 for display via the video editing interface 110. In this example, the secondary video file 511 includes frames 512a and 512b. The primary video file 500 also includes audio portions 514a and 514b that respectively correspond to the frames 512a and 512b.

In this example, the rendering engine 106 renders a display video 516 from the retrieved frames. The display video 516 includes a set of frames 502a', 502b', 504e', and 504f' that are copies of frames 502a, 502b, 504e, and 504f. The display video 516 also includes a set of frames 512a' and 512b' that are copies of frames 512a and 512b. To render the display video 516, the rendering engine 106 determines, based on one or more operations described above with respect to blocks 204-208, that primary video frames between timestamps 508 and 510 are to be replaced with secondary video frames. The rendering engine 106 orders the retrieved primary video frames and secondary video frames as frames 502a', 502b', 512a', 512b', 512a'' (i.e., a repetition of frame 512a'), 504e', and 504f'.

In some embodiments, the audio associated with the primary video remains unchanged in the video-insertion process. For instance, FIG. 5 depicts an audio track that is associated with the display video 516. The associated audio track includes audio portions 504a'-f' that are copies of audio portions 504a-f. Thus, primary audio portions 504c' and 504d' are played with secondary video frames 512a' and 512b', rather than secondary audio portions 514a and 514b being played with secondary video frames 512a' and 512b'. In additional or alternative embodiments, one or more audio portions associated with the secondary video are included along with the secondary video frames. In additional or alternative embodiments, one or more audio portions associated with the primary video are can be edited via user inputs, with the user-edited audio played back along with the secondary video frames.

In this example, the duration between timestamps 508 and 510 is greater than the duration of the set of frames 512a and 512b. The rendering engine 106 therefore loops the secondary video frames 512a' and 512b' (e.g., by inserting frame 512a'' after frame 512b'). But other implementations are possible.

Figure 6:
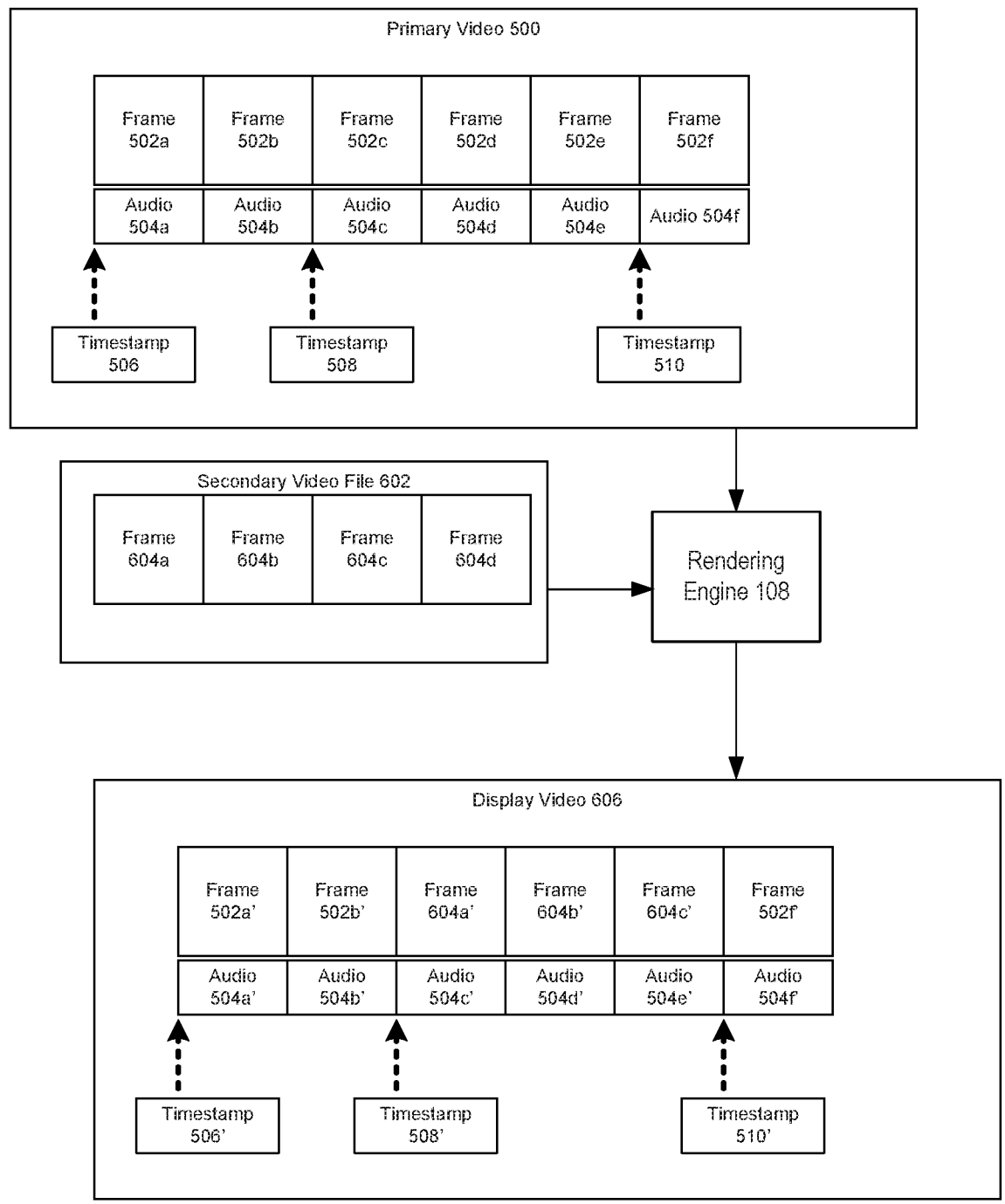
FIG. 6 depicts another example of a rendering engine inserting secondary video content frames between sets of primary content frames, according to certain embodiments of the present disclosure.

For instance, FIG. 6 depicts another example of a rendering engine 106 inserting secondary video content frames between sets of primary content frames. In the example depicted in FIG. 6, the rendering engine 106 can access, in the playback operation, a primary video file 500 that includes frames 502a-f of the primary video. In this example, the primary video file 500 again lacks any content from the selected secondary video. The primary video file 500 also includes audio portions 504a-f that correspond to different portions of the primary video. FIG. 6 also depicts the same timestamps 506, 508, and 510 that were depicted in FIG. 5.

In the playback operation, the rendering engine 106 retrieves frames from the primary video file 500 and a secondary video file 602 for display via the video editing interface 110. In this example, the secondary video file 602 includes frames 604a-d. The secondary video file 602 can also include audio content (not depicted in FIG. 6).

In FIG. 6, the rendering engine 106 renders a display video 606 from the retrieved frames. The display video 606 includes a set of frames 502a', 502b', 504e', and 504f' that are copies of frames 502a, 502b, 504e, and 504f. The display video 606 also includes a set of frames 604a'-c' that are copies of frames 604a-c. To render the display video 606, the rendering engine 106 determines, based on one or more operations described above with respect to blocks 204-208, that primary video frames between timestamps 508 and 510 are to be replaced with secondary video frames. The rendering engine 106 orders the retrieved primary video frames and secondary video frames as frames 502a', 502b', 604a', 604b', 604c', 504e', and 504f'. In this example, the duration between timestamps 508 and 510 is less than the duration of the set of frames 604a-d. The rendering engine 106 therefore selects 604a-c for the playback operation and omits the frame 604d. Thus, the set of frames 604a'-c' is a truncated version of the set of frames 604a-d.

In additional or alternative embodiments, the video editing application 102 can be used to generate recommendations for secondary videos. In these embodiments, the video editing application 102 executes an algorithm that detects relevant keywords in video transcripts based on lexical and syntactical text features, as well as text sentiment, to provide automatic recommendations for where to position secondary videos (i.e., "B-roll" footage) within a primary video (i.e., "A-roll" footage). These recommendations can be presented to users as a text overlay in the video editing interface 110. If a user clicks on a recommendation, the user can see a list of B-Roll candidate videos, which can be drawn from a video data source such as an online video database. The user can select a secondary video to insert for the selected position. In this manner, the user can create a video edited with B-roll footage.

Figure 7:
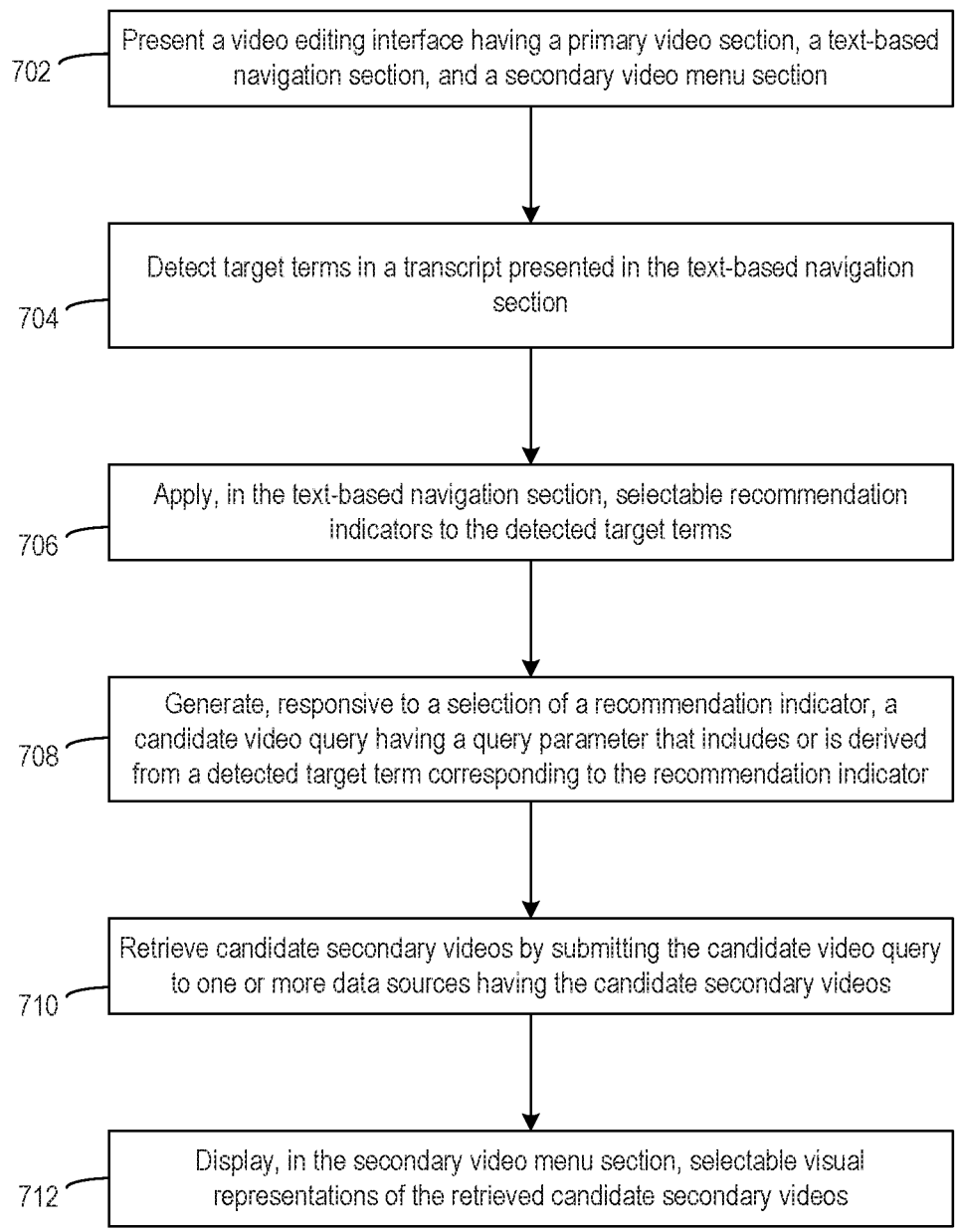
FIG. 7 depicts an example of a process for a transcript-based recommendation process that generates queries for candidate secondary videos to be inserted into a primary video, according to certain embodiments of the present disclosure.

For instance, FIG. 7 depicts an example of a process 700 for a transcript-based recommendation process that generates queries for candidate secondary videos to be inserted into a primary video. Operations depicted in FIG. 7 can be used to implement a step for generating one or more queries for candidate secondary videos to be inserted into primary video content based on selections via a navigable transcript of the primary video content. One or more computing devices (e.g., the computing environment 100) implement operations depicted in FIG. 7 by executing suitable program code (e.g., the video editing application 102). For illustrative purposes, the process 700 is described with reference to certain examples depicted in the figures. Other implementations, however, are possible.

At block 702, the process 700 involves presenting a video editing interface having a primary video section, a text-based navigation section, and a secondary video menu section. One or more computing devices can execute program code of the video editing application 102 to implement block 702. Block 702 can be implemented in a manner similar to the implementation of block 202 described above.

At block 704, the process 700 involves detecting target terms in a transcript presented in the text-based navigation section. One or more computing devices can execute program code of the video editing application 102 to implement block 704. A target term could be, for example, the phrase "help others."

Any suitable recommendation algorithm can be used to generate query parameters from a transcript. In some embodiments, the recommendation engine 108 can execute a trained recommendation algorithm that predicts a suitable start term for secondary-video insertion. A suitable start term can be a word or phrase that corresponds to a portion of the transcript and associated primary video portion at which the insertion of a secondary video is likely to aesthetically augment the primary video content. For instance, the recommendation algorithm could include a recommendation machine-learning model that analyzes terms in a transcript (e.g., words, phrases, or both) and outputs, for each term, a target term probability indicating whether the term is classified as a start term. If a given term in the transcript has a target term probability greater than a threshold probability (e.g., an absolute threshold or a relative threshold based on which terms have the highest probability), the recommendation engine 108 can select the term as a recommended search term for secondary-video insertion (i.e. a query parameter).

At block 706, the process 700 involves applying, in the text-based navigation section, selectable recommendation indicators to the detected target terms. One or more computing devices can execute program code of the video editing application 102 to implement block 706. The selectable recommendation indicators can include or otherwise identify query parameters corresponding to certain target terms that have been detected. A query parameter can include or be derived from a corresponding target term. Examples of a query parameter corresponding to a target term can be the target term itself, a portion of the target term (e.g., the beginning or end of a word or phrase), a synonym of the target term, a root word for the target term (e.g., a query parameter of "learn" from the target term "learning"), or some combination thereof.

Figure 8:
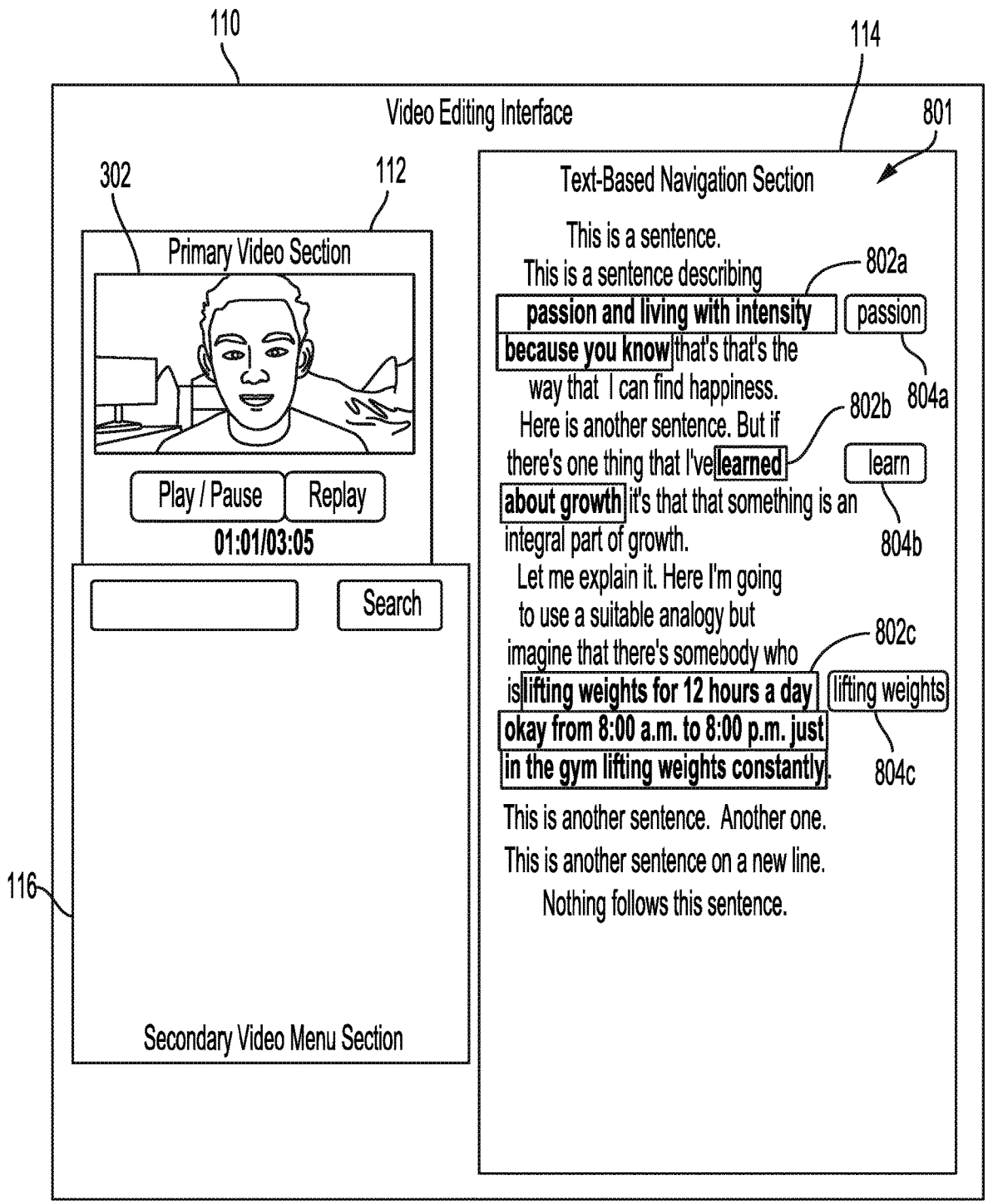
FIG. 8 depicts an example of a video editing interface used in the process of FIG. 7 to generate queries for candidate secondary videos to be inserted into a primary video, according to certain embodiments of the present disclosure.

FIG. 8 depicts an example of a video editing interface 110 for a transcript-based recommendation process that generates queries for candidate secondary videos to be inserted into a primary video. The primary video section 112 displays a primary video 302. In this example, the primary video section 112 includes playback control commands (e.g., play, pause, replay, etc.) and a timer indicating a progress of the primary video (e.g., that a currently displayed frame occurs at time 1:01 out of a total duration of 3:05 for the primary video 302).

The text-based navigation section 114 depicts a transcript 801 of audio content associated with the primary video 302 (e.g., an audio track included with the primary video content). The video editing application 102 can apply selectable recommendation indicators to the target terms in the transcript 801. In the example depicted in FIG. 8, the video editing application 102 applies visual indicators 802a-c, such as text highlighting, to portions of the transcript 801 that are used to generate query parameters. The video editing application 102 also applies selectable recommendation indicators 804a-c, which respectively correspond to the visual indicators 802a-c, to these portions of the transcript 801 (e.g., by positioning each selectable recommendation indicator adjacent or otherwise proximate to a corresponding visual indicator).

Returning to FIG. 7, at block 708, the process 700 involves generating, responsive to a selection of a recommendation indicator, a candidate video query having a query parameter that includes or is derived from a detected target term corresponding to the recommendation indicator. One or more computing devices can execute program code of the video editing application 102 to implement block 708. For instance, video editing application 102 retrieves the query parameter from a memory structure storing the potential query parameters. The video editing application 102 generates one or more queries that include the retrieved query parameter. The video editing application 102 can generate each query according to a format that is usable for a specific one of the video data sources 118. In one example, if a first video data source 118 is accessible via a first application programming interface ("API") and a second video data source 118 is accessible via a second API, the video editing application 102 can generate different function calls for the different data sources that respectively correspond to formats used by the different APIs. Both function calls can include the retrieved query parameter.

Figure 9:
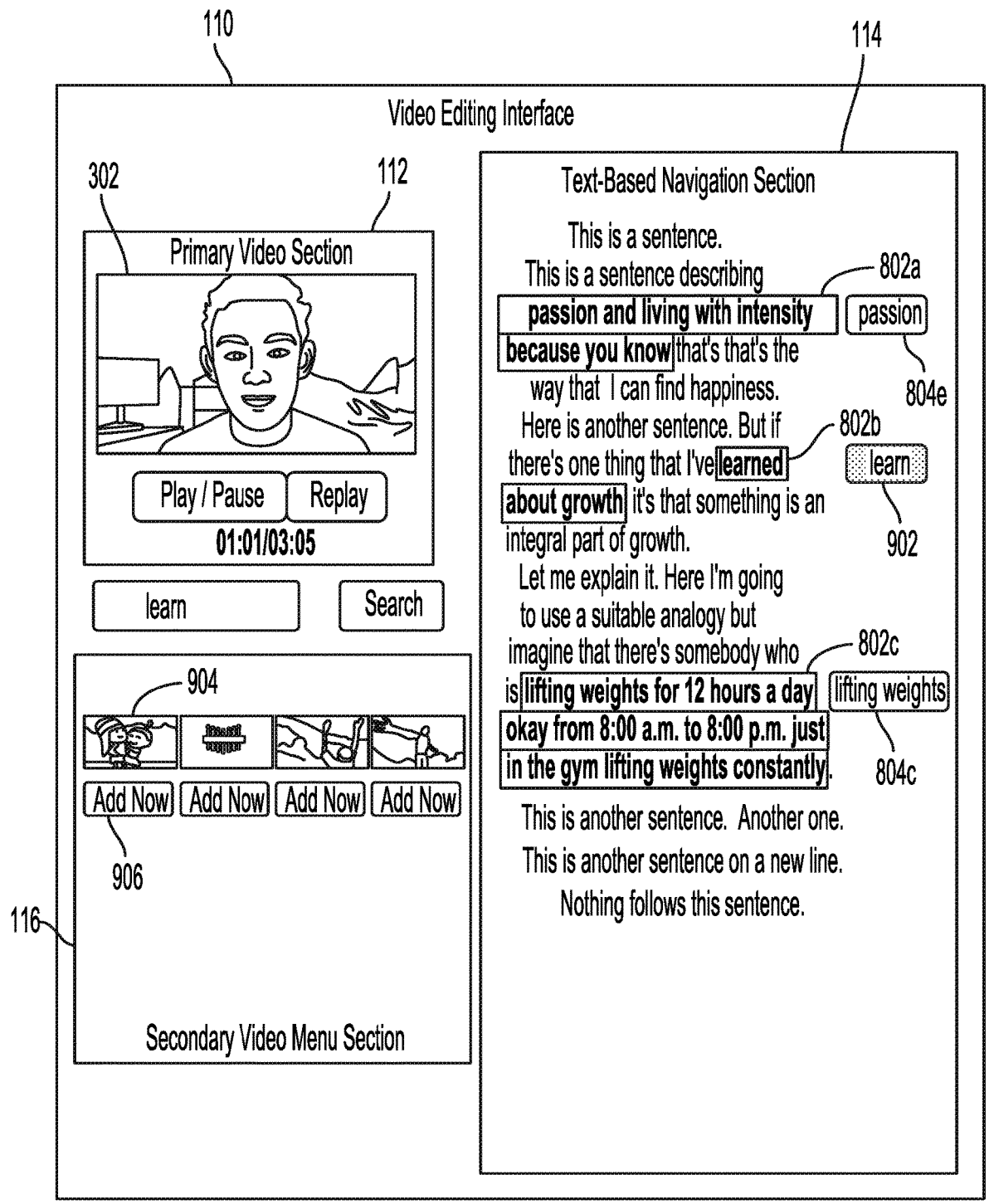
FIG. 9 depicts an example of selecting one of the recommendation indicators from the interface of FIG. 8, according to certain embodiments of the present disclosure.

The video editing application 102 can also update the video editing interface 110 to indicate a selection of a recommendation indicator. For instance, FIG. 9 depicts an example of selecting one of the recommendation indicators. In this example, the video editing application 102 has received a selection of a recommendation indicator for the query term "learn." The video editing application 102 modifies the appearance of the recommendation indicator based on the selection, such as changing the text color and fill color for a graphical object that is the selected recommendation indicator 902.

Returning to FIG. 7, at block 710, the process 700 involves retrieving candidate secondary videos by submitting the candidate video query to one or more data sources having the candidate secondary videos. One or more computing devices can execute program code of the video editing application 102 to implement block 710. The video editing application 102 can configure one or more devices to transmit one or more queries to one or more video data sources 118. The video editing application 102 can receive, from the video data sources 118, the candidate secondary videos matching the query parameters of the transmitted queries. The video editing application 102 can store the received candidate secondary videos in a suitable memory device for use by the video editing application 102.

In some embodiments, transmitting a query can involve configuring a network interface device to transmit, via a data network, a query to a computing device that hosts a video data source 118 and that is remote from the computing device executing the video editing application 102. In additional or alternative embodiments, transmitting a query can involve configuring a processing device that executes the video editing application 102 to transmit, via a local data bus, a query to a memory device at the same computing system that includes the processing device.

At block 712, the process 700 involves displaying, in the secondary video menu section, selectable visual representations of the retrieved candidate secondary videos. One or more computing devices can execute program code of the video editing application 102 to implement block 712. For instance, the video editing application 102 can access thumbnails corresponding to frames of the retrieved candidate secondary videos, "cover" images included in or specified by metadata of the retrieved candidate secondary videos, or other graphics that are used to represent the retrieved candidate secondary videos. The video editing application 102 can populate the secondary video menu section 116 with these visual representations.

For instance, in the example depicted in FIG. 9, the video editing application 102 has performed the operations of blocks 710 and 712 based on the selected recommendation indicator 902. The video editing application 102 updates the secondary video menu section 116 to display visual representations 904 of retrieved candidate secondary videos. The secondary video menu section 116 also includes one or more control elements 906 for inserting one or more of the retrieved candidate secondary videos into the primary video 302. The video editing application 102 can implement the process 200 using the candidate secondary videos retrieved via the process 700.

Any suitable process can be used for detecting target terms in the process 700. In some embodiments, the recommendation engine 108 can access a set of words in the transcript for consideration in a query-generation process. The recommendation engine 108 can select for the set or exclude certain words from the set by applying, to each word, a recommendation machine-learning model to a target feature vector for the word. The target feature vector can represent one or more attributes of the word with respect to the transcript in which the word (or a modified version of the word) appears. For instance, a target feature vector can be a combination (e.g., a concatenation) of one or more component feature vectors. Examples of these component feature vectors include a frequency feature vector representing a frequency of the word within the transcript, a sentiment feature vector representing sentiments associated with the word within the transcript, and a part-of-speech feature vector representing syntaxes of the word within the transcript. In one example, the recommendation engine 108 generates the component feature vectors by computing term frequency-inverse document frequency ("TF-IDF") scores for various words in the transcript, computing words sentiments for various words in the transcript, determining each part of speech ("POS") in which for a given word in the transcript, and the numbers of occurrences of various words in the transcript. The recommendation engine 108 can also exclude stop-words, which can be frequently occurring words (e.g., "the," "or," "and," etc.) in a target language (e.g., English).

For a given word, the recommendation engine 108 can concatenate a frequency feature vector (e.g., a feature vector computed from an TF-IDF term), a sentiment feature vector representing a sentiment, a POS feature vector representing different parts of speech, and a repetition feature vector into a target feature vector (e.g., a 5,033-dimensional vector).

The recommendation engine 108 can apply a suitable recommendation machine-learning model, such as a linear classifier (e.g., a support vector machine with a linear kernel) or other classifier, to each target feature vector. If the classifier outputs a value indicating that a target term corresponding to a given target feature vector is likely to be a suitable start term, the recommendation engine 108 selects the target term for use in generating recommendation queries. If the classifier outputs a value indicating that a target term corresponding to a given target feature vector is unlikely to be a suitable start term, the recommendation engine 108 excludes the target term from a process for generating recommendation queries. Examples of these outputted values are target term probabilities, where a target term probability indicates a probability of a given word being a suitable start term.

In some embodiments, the recommendation machine-learning model is trained to associate training target feature vectors with training words tagged as secondary video search terms in training transcripts. For instance, a recommendation machine-learning model can be trained using training target feature vectors, which are generated from transcripts of training videos, along with expert annotations of the training videos, where the annotations indicate whether certain target terms from the transcript are suitable start terms. The training process for the recommendation machine-learning involves learning associations between feature vectors for certain words in a transcript and expert annotations indicating that those words are suitable start words (e.g., words indicating portions of the primary video where B-roll insertion would aesthetically augment the primary video).

The component terms of the term feature vector can be computed in any suitable manner. For instance, the recommendation engine 108 can compute TF-IDF terms, such as TF-IDF feature vectors, from a combination of a frequency of a given word within a transcript and a frequency of the word within a larger set of documents (e.g., a frequency of the word in training transcripts, a frequency of the word in previously encountered transcripts, etc.). The TF-IDF terms can be computed for various words in the transcript. TF-IDF is computed via a learned TF-IDF representation, where the learned TF-IDF representation assigns an index in the vector representation to each word, and a score associated with that position (essentially a lookup table). For a newly encountered transcript, every word is vectorized by referencing the index of the word and the associated score.

The recommendation engine 108 can also execute any suitable sentiment classifier to perform the sentiment analysis and thereby generate a sentiment term. An example of a sentiment classifier is described in Hutto, C. J. and E. E. Gilbert, "VADER: A Parsimonious Rule-based Model for Sentiment Analysis of Social Media Text," Eighth International Conference on Weblogs and Social Media (June 2014), which is incorporated by reference herein. The sentiment classifier in that example computes a continuous sentiment score from −1.0 (very negative) to 1.0 (very positive). The sentiment term models the potential impact of text sentiment on the video. The recommendation engine 108 can also compute POS tags using any suitable tagging process and thereby generate POS terms for various words and phrases in the transcript. An example of a suitable tagging process is described in Eliyahu Kiperwasser and Yoav Goldberg, "Simple and accurate dependency parsing using bidirectional LSTM feature representations," TACL (2016). The recommendation engine 108 can translate the POS tags into numeric scores using a one-hot feature vector (e.g., 1 for the position that corresponds to the POS tag of the word and 0 elsewhere). Such a one-hot feature vector term can model potential signals of certain parts of speech (e.g., nouns) being more likely to be a suitable query parameter than others. The recommendation engine 108 can also compute a repetition term that accounts for repeated occurrences of a given word by giving a score to each word equal to the number of previous occurrences of the same word. The repetition terms can be computed for various words and phrases in the transcript. A repetition term can model the potential decrease in the importance of a words as the words occurs repeatedly.

For illustrative purposes, the example provided above involves words in a transcript. But other implementations are possible. For instance, in additional or alternative embodiments, the recommendation engine 108 can execute a natural language processing engine to extract a set of phrases from the transcript. The recommendation engine 108 can generate one or more of the feature vectors identified above (e.g., a frequency feature vector, a sentiment feature vector, etc.) for each phrase. The recommendation engine 108 can also generate, for each phrase, a target feature vector by concatenating or otherwise combining multiple component feature vectors (e.g., a frequency feature vector, a sentiment feature vector, etc.). A recommendation machine-learning model that is trained to classified phrases can be applied to these phrase-based target feature vectors. The recommendation engine 108 can select one or more phrases as target terms based on the output of the recommendation machine-learning model. For instance, the recommendation engine 108 can select the top k phrases with the highest target term probabilities, the phrases with the target term probabilities greater than a user-specified threshold probability, etc.

Computing System Example for Transcript-Based Video-Insertion Techniques

Figure 10:
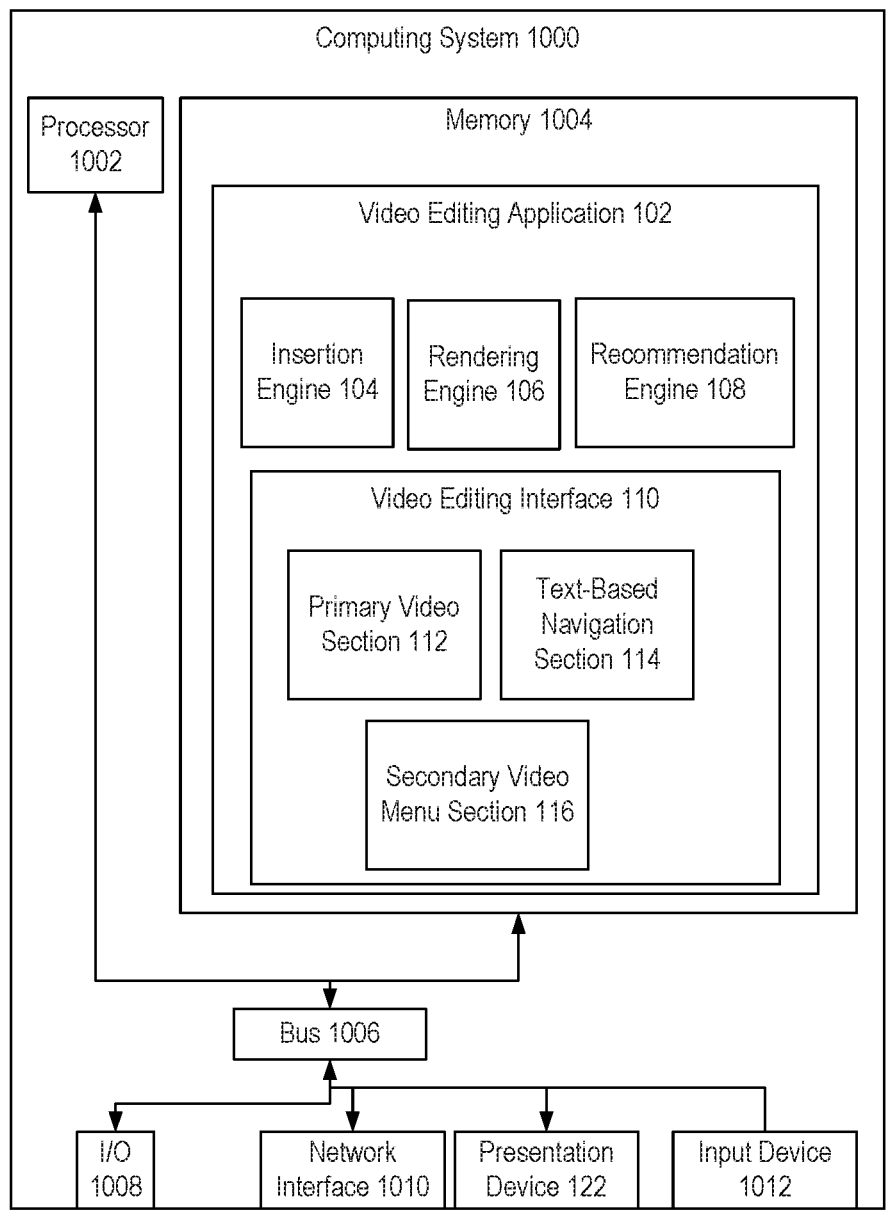
FIG. 10 depicts an example of a computing system that can implement the video editing environment of FIG. 1, according to certain embodiments of the present disclosure.

Any suitable computing system or group of computing systems can be used for performing the operations described herein. For example, FIG. 10 depicts an example of a computing system 1000 that can implement the video editing environment of FIG. 1. In some embodiments, the computing system 1000 includes a processing device 1002 that executes the video editing application 102, a memory that stores various data computed or used by the video editing application 102, and a presentation device 122 that displays graphical content generated by the video editing application 102. For illustrative purposes, FIG. 10 depicts a single computing system. But various application engines, datasets, and devices can be stored or included across different computing systems having devices similar to the devices depicted in FIG. 10.

The depicted example of a computing system 1000 includes a processing device 1002 communicatively coupled to one or more memory devices 1004. The processing device 1002 executes computer-executable program code stored in a memory device 1004, accesses information stored in the memory device 1004, or both. Examples of the processing device 1002 include a microprocessor, an application-specific integrated circuit ("ASIC"), a field-programmable gate array ("FPGA"), or any other suitable processing device. The processing device 1002 can include any number of processing devices, including a single processing device.

The memory device 1004 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 may also include a number of external or internal devices, such as an input device 1012, a presentation device 122, or other input or output devices. For example, the computing environment 400 is shown with one or more input/output ("I/O") interfaces 1008. An I/O interface 1008 can receive input from input devices local to the computing system 1000 (e.g., a mouse, a touchpad, a touchscreen, keyboard) or provide output to output devices (e.g., a monitor, a laptop screen, a separate computing device, etc.). One or more buses 1006 are also included in the computing system 1000. The bus 1006 communicatively couples one or more components of a respective one of the computing system 1000.

The computing system 1000 executes program code that configures the processing device 1002 to perform one or more of the operations described herein. The program code includes, for example, the video editing application 102 or other suitable applications that perform one or more operations described herein. The program code may be resident in the memory device 1004 or any suitable computer-readable medium and may be executed by the processing device 1002 or any other suitable processor. In some embodiments, all modules in the video editing application 102 (e.g., the insertion engine 104, the rendering engine 106, etc.) are stored in the memory device 1004, as depicted in FIG. 10. In additional or alternative embodiments, one or more of these modules from the video editing application 102 are stored in different memory devices of different computing systems.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., a computing device that receives inputs for the video editing application 102 or displays outputs of the video editing application 102) via a data network using the network interface device 1010.

An input device 1012 can include any device or group of devices suitable for receiving visual, auditory, or other suitable input that controls or affects the operations of the processing device 1002. Non-limiting examples of the input device 1012 include a touchscreen, a mouse, a keyboard, a microphone, a separate mobile computing device, etc. A presentation device 122 can include any device or group of devices suitable for providing visual, auditory, or other suitable sensory output. Non-limiting examples of the presentation device 122 include a touchscreen, a monitor, a separate mobile computing device, etc.

Although FIG. 10 depicts the input device 1012 and the presentation device 122 as being local to the computing device that executes the video editing application 102, other implementations are possible. For instance, in some embodiments, one or more of the input device 1012 and the presentation device 122 can include a remote client-computing device that communicates with the computing system 1000 via the network interface device 1010 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices performs operations comprising:
    presenting a video editing interface comprising a primary video section displaying a primary video, a text-based navigation section having selectable portions of a transcript of the primary video that trigger navigation to respective portions of the primary video, and a secondary video menu section displaying candidate secondary videos;
    selecting a portion of the transcript corresponding to a text-selection input received at the text-based navigation section;
    identifying a portion of the primary video corresponding to the selected portion of the transcript;
    detecting target terms in the portion of the transcript;
    generating a candidate video query based on the detected target terms in the selected portion of the transcript;
    retrieving candidate secondary videos in response to submitting the candidate video query to one or more data sources;
    selecting, from the retrieved candidate secondary videos, a secondary video corresponding to a video-selection input received at the secondary video menu section; and
    inserting the selected secondary video into the primary video to replace the identified portion of the primary video.

2. The method of claim 1, wherein inserting the selected secondary video into the primary video to replace the identified portion of the primary video comprises:
    identifying a first time stamp, a second time stamp, and a third time stamp that are associated with playback of the primary video, wherein the second time stamp corresponds to the identified portion of the primary video; and
    performing a playback operation in the video editing interface, wherein the playback operation comprises:
        rendering first frames from the primary video for display between the first time stamp of the primary video and the second time stamp of the primary video,
        determining that the selected secondary video has been selected for insertion into the primary video,
        rendering frames retrieved from the secondary video for display starting at the second time stamp and continuing for a duration between the second time stamp and the third time stamp, and
        rendering second frames from the primary video for display starting from the third time stamp of the primary video.

3. The method of claim 2, wherein performing the playback operation comprises retrieving the first frames and the second frames from a primary video file that includes the primary video and that lacks any content from the selected secondary video.

4. The method of claim 1, wherein the video-selection input comprises a dragging input that drags a visual representation of the selected secondary video over the selected portion of the transcript in the text-based navigation section.

5. The method of claim 1, the operations further comprising:
    applying, in the text-based navigation section, selectable recommendation indicators to the detected target terms;
    receiving a selection of a particular selectable recommendation indicator of the selectable recommendation indicators,
    wherein the candidate video query is generated responsive to the selection and includes a query parameter that includes or is derived from a detected particular target term corresponding to the particular selectable recommendation indicator; and
    displaying selectable visual representations of the retrieved candidate secondary videos.

6. The method of claim 1, wherein detecting the target terms in the portion of the transcript comprises:

accessing a set of words included in the portion of the transcript;

computing a set of target term probabilities for the set of words, wherein, for each word of the set of words, a respective target term probability is computed by performing additional operations comprising:

generating a frequency feature vector representing a frequency of the word within the transcript, a sentiment feature vector representing sentiments associated with the word within the transcript, and a part-of-speech feature vector representing syntaxes of the word within the transcript, combining the frequency feature vector, the sentiment feature vector, and the part-of-speech feature vector into a target feature vector for the word, and computing the respective target term probability by applying a recommendation machine-learning model to the target feature vector, wherein the recommendation machine-learning model is trained to associate training target feature vectors with training words tagged as secondary video search terms in training transcripts; and selecting, from the set of words included in the portion of the transcript, the target terms having respective target term probabilities that exceed a threshold probability.

7. The method of claim 1, the operations further comprising obtaining the candidate secondary videos by performing operations;

receiving a target term via a search field of the secondary video menu section, wherein the candidate video query further includes a query parameter that includes or is derived from the received target term.

8. The method of claim 1, wherein, subsequent to insertion of the selected secondary video into the primary video, audio content associated with the identified portion of the primary video is playable with the selected secondary video.

9. A system, comprising:

one or more processors; and a memory coupled with the one or more processors, the memory configured to store instructions that when executed by the one or more processors cause the one or more processors to:

present a video editing interface comprising a primary video section displaying a primary video, a text-based navigation section having selectable portions of a transcript of the primary video that trigger navigation to respective portions of the primary video, and a secondary video menu section displaying candidate secondary videos;

select a portion of the transcript corresponding to a text-selection input received at the text-based navigation section;

identify a portion of the primary video corresponding to the selected portion of the transcript;

detect target terms in the portion of the transcript;

generate a candidate video query based on the detected target terms in the selected portion of the transcript;

retrieve candidate secondary videos in response to submitting the candidate video query to one or more data sources;

select, from the retrieved candidate secondary videos, a secondary video corresponding to a video-selection input received at the secondary video menu section; and insert the selected secondary video into the primary video to replace the identified portion of the primary video.

10. The system of claim 9, wherein inserting the selected secondary video into the primary video to replace the identified portion of the primary video comprises:

identifying a first time stamp, a second time stamp, and a third time stamp that are associated with playback of the primary video, wherein the second time stamp corresponds to the identified portion of the primary video; and performing a playback operation in the video editing interface, wherein the playback operation comprises:

rendering first frames from the primary video for display between the first time stamp of the primary video and the second time stamp of the primary video, determining that the selected secondary video has been selected for insertion into the primary video, rendering frames retrieved from the secondary video for display starting at the second time stamp and continuing for a duration between the second time stamp and the third time stamp, and rendering second frames from the primary video for display starting from the third time stamp of the primary video.

11. The system of claim 10, wherein performing the playback operation comprises retrieving the first frames and the second frames from a primary video file that includes the primary video and that lacks any content from the selected secondary video.

12. The system of claim 9, wherein the video-selection input comprises a dragging input that drags a visual representation of the selected secondary video over the selected portion of the transcript in the text-based navigation section.

13. The system of claim 9, wherein the memory is further configured to store instructions that when executed by the one or more processors cause the one or more processors to:

apply, in the text-based navigation section, selectable recommendation indicators to the detected target terms;

receive a selection of a particular selectable recommendation indicator of the selectable recommendation indicators, wherein the candidate video query includes a query parameter that includes or is derived from a detected particular target term corresponding to the particular selected recommendation indicator; and display selectable visual representations of the retrieved candidate secondary videos.

14. The system of claim 9, wherein detecting the target terms in the portion of the transcript comprises:

accessing a set of words included in the portion of the transcript;

computing a set of target term probabilities for the set of words, wherein, for each word of the set of words, a respective target term probability is computed by performing additional operations comprising:

generating a frequency feature vector representing a frequency of the word within the transcript, a sentiment feature vector representing sentiments associated with the word within the transcript, and a part-of-speech feature vector representing syntaxes of the word within the transcript, combining the frequency feature vector, the sentiment feature vector, and the part-of-speech feature vector into a target feature vector for the word, and computing the respective target term probability by applying a recommendation machine-learning model to the target feature vector, wherein the recommendation machine-learning model is trained to associate training target feature vectors with training words tagged as secondary video search terms in training transcripts; and selecting, from the set of words included in the portion of the transcript, the target terms having respective target term probabilities that exceed a threshold probability.

15. The system of claim 9, wherein the memory is further configured to store instructions that when executed by the one or more processors cause the one or more processors to:
receive a target term via a search field of the secondary video menu section, wherein the candidate video query further includes a query parameter that includes or is derived from the received target term.

16. The system of claim 9, wherein, subsequent to insertion of the selected secondary video into the primary video, audio content associated with the identified portion of the primary video is playable with the selected secondary video.

17. A non-transitory computer-readable storage medium storing instructions, executable by one or more processors, the instructions comprising:
presenting a video editing interface comprising a primary video section displaying a primary video, a text-based navigation section having selectable portions of a transcript of the primary video that trigger navigation to respective portions of the primary video, and a secondary video menu section displaying candidate secondary videos;
selecting a portion of the transcript corresponding to a text-selection input received at the text-based navigation section;
identifying a portion of the primary video corresponding to the selected portion of the transcript;
detecting target terms in the portion of the transcript;
generating a candidate video query based on the detected target terms in the selected portion of the transcript;
retrieving candidate secondary videos in response to submitting the candidate video query to one or more data sources;
selecting, from the retrieved candidate secondary videos, a secondary video corresponding to a video-selection input received at the secondary video menu section; and
inserting the selected secondary video into the primary video to replace the identified portion of the primary video.

18. The non-transitory computer-readable storage medium of claim 17, wherein inserting the selected secondary video to replace the primary video at the identified portion of the primary video comprises:
identifying a first time stamp, a second time stamp, and a third time stamp that are associated with playback of the primary video, wherein the second time stamp corresponds to the identified portion of the primary video; and performing a playback operation in the video editing interface, wherein the playback operation comprises:
rendering first frames from the primary video for display between the first time stamp of the primary video and the second time stamp of the primary video,
determining that the selected secondary video has been selected for insertion into the primary video,
rendering frames retrieved from the secondary video for display starting at the second time stamp and continuing for a duration between the second time stamp and the third time stamp, and
rendering second frames from the primary video for display starting from the third time stamp of the primary video.

19. The non-transitory computer-readable storage medium of claim 17, the instructions further comprising:
applying, in the text-based navigation section, selectable recommendation indicators to the detected target terms;
receiving a selection of a particular selectable recommendation indicator of the selectable recommendation indicators, wherein the candidate video query includes a query parameter that includes or is derived from a detected particular target term corresponding to the particular selected recommendation indicator; and
displaying selectable visual representations of the retrieved candidate secondary videos.

20. The non-transitory computer-readable storage medium of claim 19, wherein detecting the target terms in the transcript comprises:
accessing a set of words included in the portion of the transcript;
computing a set of target term probabilities for the set of words, wherein, for each word of the set of words, a respective target term probability is computed by performing additional operations comprising:
generating a frequency feature vector representing a frequency of the word within the transcript, a sentiment feature vector representing sentiments associated with the word within the transcript, and a part-of-speech feature vector representing syntaxes of the word within the transcript,
combining the frequency feature vector, the sentiment feature vector, and the part-of-speech feature vector into a target feature vector for the word, and
computing the respective target term probability by applying a recommendation machine-learning model to the target feature vector, wherein the recommendation machine-learning model is trained to associate training target feature vectors with training words tagged as secondary video search terms in training transcripts; and
selecting, from the set of words included in the portion of the transcript, the target terms having respective target term probabilities that exceed a threshold probability.

* * * * *